United States Patent
Boggess

(10) Patent No.: US 7,760,076 B2
(45) Date of Patent: Jul. 20, 2010

(54) VEHICLE DISABLING SYSTEM AND PROCESS

(75) Inventor: Brian Boggess, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 11/865,168

(22) Filed: Oct. 1, 2007

(65) Prior Publication Data
US 2009/0085731 A1    Apr. 2, 2009

(51) Int. Cl.
B60R 25/10    (2006.01)

(52) U.S. Cl. .................. 340/426.11; 340/426.13; 307/10.2

(58) Field of Classification Search .......... 340/425.5, 340/426.1, 426.11, 426.12, 426.13; 307/10.2, 307/10.3, 10.6
See application file for complete search history.

(56) References Cited

U.S. PATENT DOCUMENTS

| | | | |
|---|---|---|---|
| 4,067,411 A * | 1/1978 | Conley et al. .............. 180/169 |
| 4,660,528 A | 4/1987 | Buck | |
| 5,276,728 A | 1/1994 | Pagliaroli et al. | |
| 5,463,372 A * | 10/1995 | Mawyer, Sr. .............. 340/428 |
| 5,933,075 A | 8/1999 | Ditson | |
| 6,124,805 A | 9/2000 | Gabbard | |
| 6,897,762 B2 | 5/2005 | Howells | |
| 7,049,709 B2 | 5/2006 | Boggs | |
| 7,088,219 B2 | 8/2006 | Dawson et al. | |
| 7,333,012 B1 * | 2/2008 | Nguyen .............. 340/539.1 |

* cited by examiner

*Primary Examiner*—Jeffery Hofsass
(74) *Attorney, Agent, or Firm*—Mark E. Duell, Esq.; Emerson, Thomson & Bennett

(57) ABSTRACT

The present invention generally relates to processes and/or devices that are capable of stopping a vehicle in response to a remote signal. Some embodiments are capable of preserving electrical power to one or more safety-related devices or systems after the engine is shut down. Some devices embodying the present invention can include a receiver, an engine-shutdown means, and a power maintaining means.

28 Claims, 4 Drawing Sheets

VEHICLE DISABLING SYSTEM AND PROCESS

BACKGROUND OF THE INVENTION

A. Field of Invention

This invention relates to systems and processes for disabling a vehicle while maintaining power to some portions of the vehicle. Some embodiments are useful for allowing a driver to safely stop a disabled car.

B. Description of the Related Art

Several processes and related devices are known for remotely disabling an automobile. Such devices may be used, for example, by police to safely stop a fleeing vehicle and avoiding a high-speed chase. Some known processes and devices involve stopping the engine of the target vehicle. However, the prior art lacks devices and/or processes that maintain power to certain safety-related systems such as power braking and power steering systems.

The present invention provides processes and devices for remotely stopping a vehicle while power to one or more electrically-powered safety systems.

SUMMARY OF THE INVENTION

Some embodiments of the present invention relate to a vehicle disabling process, comprising the steps of: identifying a license plate number of a target vehicle; using the license plate number to lookup a code that is specific to the target vehicle; transmitting the code to the target vehicle from a remote transmitter; receiving the transmitted signal in the target vehicle; the target vehicle using the received signal to shut off an engine in the target vehicle; and maintaining power to the target vehicle's braking system, power steering system, or both the braking system and power steering system after engine shut-off. In one embodiment, the step of maintaining power further includes supplying power from an alternate power source to at least one engine-driven hydraulic pump.

Other embodiments relate to a vehicle disabling system, comprising: a kill code receiver disposed in a target vehicle and capable of receiving transmissions from the kill code transmitter disposed in a targeting vehicle; an engine shutdown component in electronic communication with the kill code receiver, the engine shutdown component being capable of shutting down an engine of the target vehicle; and a power-maintaining component capable of maintaining power to one or more systems of the target vehicle.

Other embodiments relate to a vehicle disabling system including a power-maintaining component capable of maintaining power to one or more systems of the target vehicle, in which the power-maintaining component includes a control unit in electronic communication with the kill code receiver and in electronic communication with a relay, the relay receiving power from a vehicle battery and supplying power to at least one engine-driven hydraulic pump. In one embodiment, the relay is in a power-off configuration unless the relay receives a control signal from the control unit causing the relay to switch to a power-on configuration. In another embodiment, the relay is in a power-off configuration when the engine is on, and the relay is in a power-on configuration when the engine is off.

Still other embodiments relate to a vehicle disabling system, comprising: a relational means for relating license plate number data to kill code data; an interfacing means allowing a user to communicate and interface with the relational means; a transmitting means for transmitting kill code data; a receiving means for receiving kill code data from the transmitting means; an engine shutdown means for shutting down an engine; a power maintaining means for maintaining power to one or more sub-systems after engine shutdown.

Other benefits and advantages will become apparent to those skilled in the art to which it pertains upon reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
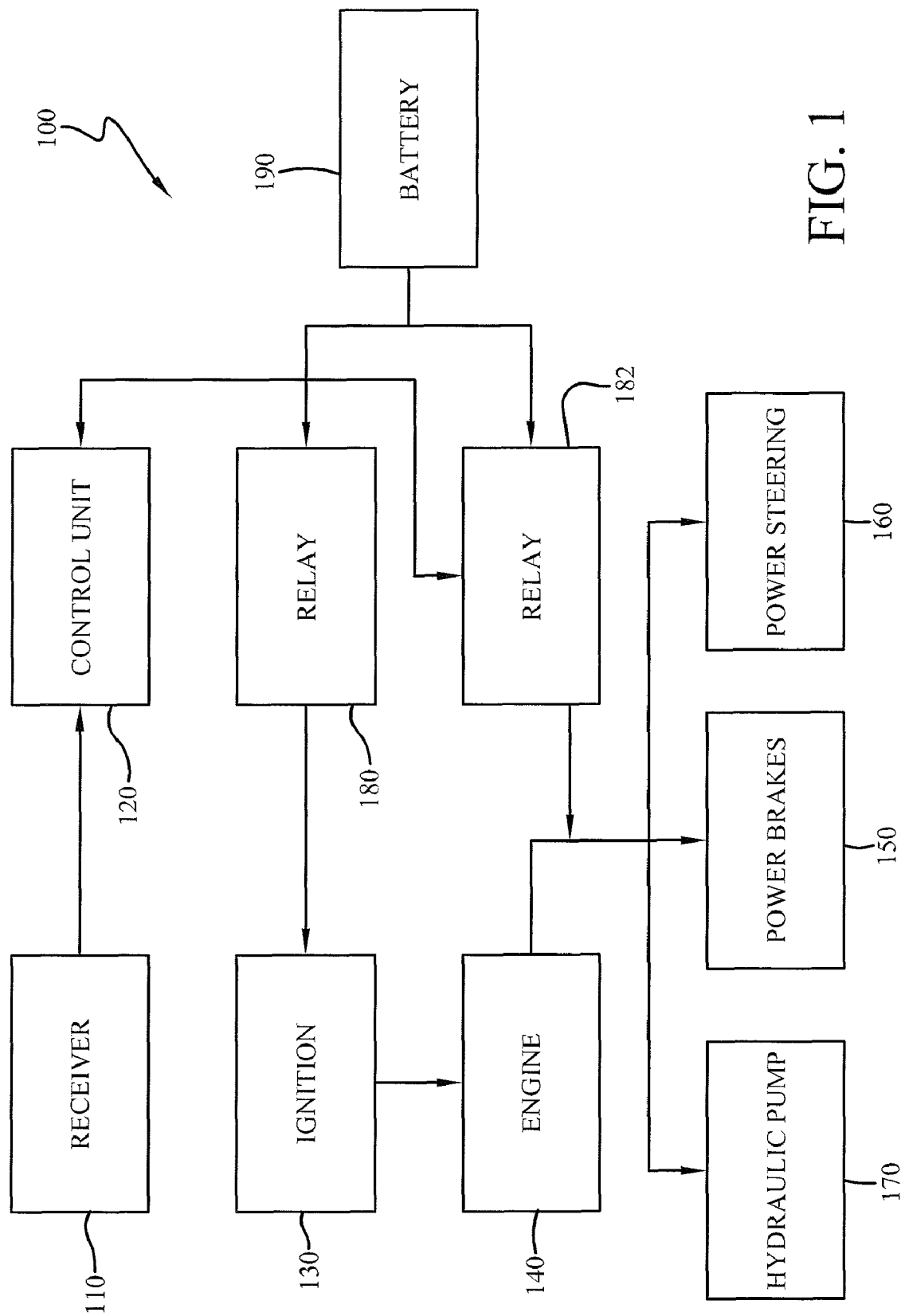
FIG. 1 is a schematic drawing of a receiving embodiment.

As used herein the term infrared includes electromagnetic radiation from about 1 µm to about 100 µm. As used herein the term microwave includes electromagnetic radiation from about 100 µm to about 1 cm. As used herein the term radio includes electromagnetic radiation from about 1 cm to greater than $10^6$ m.

The present invention generally relates to systems and methods for safely and remotely disabling a vehicle. For example, some embodiments enable a police officer to remotely disable a fleeing vehicle while preserving the driver's ability to operate the power steering and power braking systems.

According to one embodiment, a process according to the present invention includes the following steps. A receiver in a target vehicle receives a kill code from a transmitter located in a targeting vehicle, and passes the signal on to a control unit. In response to the signal, the control unit signals a relay to shut off power to the ignition system, causing the engine to stall. After or simultaneous with engine shutdown, the control unit signals one or more additional relays supplying power to the braking and/or steering systems to either switch to power-on mode, or to remain in power-on mode. In these embodiments, the power may be supplied either by the vehicle's main battery or by a separate dedicated battery.

As used herein the term kill code includes any alphanumeric combination, regardless of form or medium, which is capable of being transmitted and received, and which is capable of causing engine shutdown when received and interpreted by an appropriate device. Kill codes can be stored in databases on any computer-readable medium, and can be transmitted according to any known electronic or electromagnetic transmission methods and devices. Kill codes can vary from one make to another, one model to another, or may be unique to each individual vehicle.

A system in accordance with the present invention can comprise a kill code receiver, an engine shutdown component, and a power-maintaining component. A kill code receiver can comprise any receiver capable of receiving electromagnetic signals having the frequency of a kill code transmission. Suitable receivers can include infrared receivers, microwave receivers, radio receivers, or any combination thereof. For example, if the signal is transmitted by a microwave laser, then the receiver should be capable of receiving microwave signals of the same frequency. The engine shut down component and the power-maintaining component can comprise any appropriate switching device that is capable of gating electrical power from a source. Typical switching devices include, without limitation, switches, relays and any combination thereof.

Other embodiments can include one or more optional components. For example, in one embodiment the system can also comprise devices disposed remotely from the target vehicle in addition to the components already set forth, which are disposed within the target vehicle. Some optional components can include, without limitation, a database, a terminal, and a kill code transmitter.

In one embodiment the database can include license plate number data, kill code data, and can relate the license plate number data to corresponding kill code data. Accordingly, the database can be queried using a license plate number to return a kill code corresponding to a vehicle assigned the queried license plate number. In some embodiments, the database can be disposed in a targeting vehicle. In other embodiments the database can be disposed remotely from the targeting vehicle and can communicate with a terminal on-board the targeting vehicle. The terminal of this embodiment is equipped, or in communication, with at least one transmitter and at least one receiver for bidirectional communication with the database. According to this embodiment, the database can be remotely queried from the targeting vehicle through user input at the terminal, and the terminal is capable of displaying transmissions from the database.

In a related embodiment, the database can be remotely queried from the targeting vehicle through user input at the terminal, but the terminal may not display transmissions from the database. Rather, according to one embodiment, the kill code may be sent directly to the kill code transmitter. Alternatively, the kill code may be both displayed on the terminal and sent to the kill code transmitter. Or, in still another alternative embodiment, the kill code may be sent directly to the transmitter, and the terminal may display a related notice to the user.

Suitable kill code transmitters can comprise any of a variety of known transmission devices including, without limitation, infrared, microwave, radio waves, or any combination thereof. Furthermore, suitable kill code transmitters can emit broadband radiation, radiation bands, line emissions, or any combination thereof. Still further, suitable transmitters can emit collimated, uncollimated, or laser radiation. In some embodiments, a kill code transmitter can accept input from a local user, from a remote computer, from both a local user and a remote computer, or any combination thereof. For example, in some embodiments a local user can read a kill code from a terminal screen and key the code into the transmitter. In other embodiments, the kill code can be sent directly to the transmitter. And in still other embodiments, the transmitter is capable of accepting either user or remote inputs.

Referring now to the drawings wherein the showings are for purposes of illustrating embodiments of the invention only and not for purposes of limiting the same, FIG. 1 is a schematic diagram showing the connectivity of some components of an embodiment 100. According to this embodiment, a receiver 110 is in electronic communication with a control unit 120. The receiver 110 is adapted to pass a signal, such as a kill code, to the control unit 120. The control unit is in electronic communication with relays 180 and 182. The control unit is adapted to pass a control signal to relays 180 and 182. Some signals from the control unit to the relays can cause one or more of the relays to turn on, or to turn off. Furthermore, in some embodiments the relays can be actuated either together or separately. For instance, relay 180 may receive a signal causing it to be switch on while relay 182 receives no signal or a different signal. In some embodiments the relays are addressed so that a signal broadcasted by the control unit is only interpreted by a selected relay.

With further reference to FIG. 1, both relay 180 and relay 182 are in electrical communication with, and receive power from, a battery component 190. Relay 180 is also in electrical communication with, and provides power to, an ignition system 130 when the relay 180 is in the "ON" state. The ignition system 130 is in electrical communication with an engine 140, and supplies sparks for causing combustion and operating the engine 140. The engine 140 generates mechanical energy that can be converted into electrical energy. Converted electrical energy is supplied to a power braking system 150, to a power steering system 160, and to an engine-driven hydraulic pump 170. The power braking and power steering systems and the engine-driven hydraulic pump are also in electrical communication with relay 182, and adapted to receive electrical power therefrom when relay 182 is in the "ON" state. According to FIG. 1, a vehicle comprising this system operates under engine power when relay 180 is in the "ON" state, and relay 182 is in the "OFF" state. Further according to FIG. 1, a controlled shutdown can occur when relay 180 is switched to the "OFF" state and relay 182 is switched to the "ON" state. According to some embodiments, controlled shut-downs can occur when relay 180 is switched off before relay 182 is switched on, or when relays 180 and 182 are switched simultaneously, or when relay 182 is switched on before relay 180 is switched off. In still other embodiments, relay 182 is absent.

Figure 2:
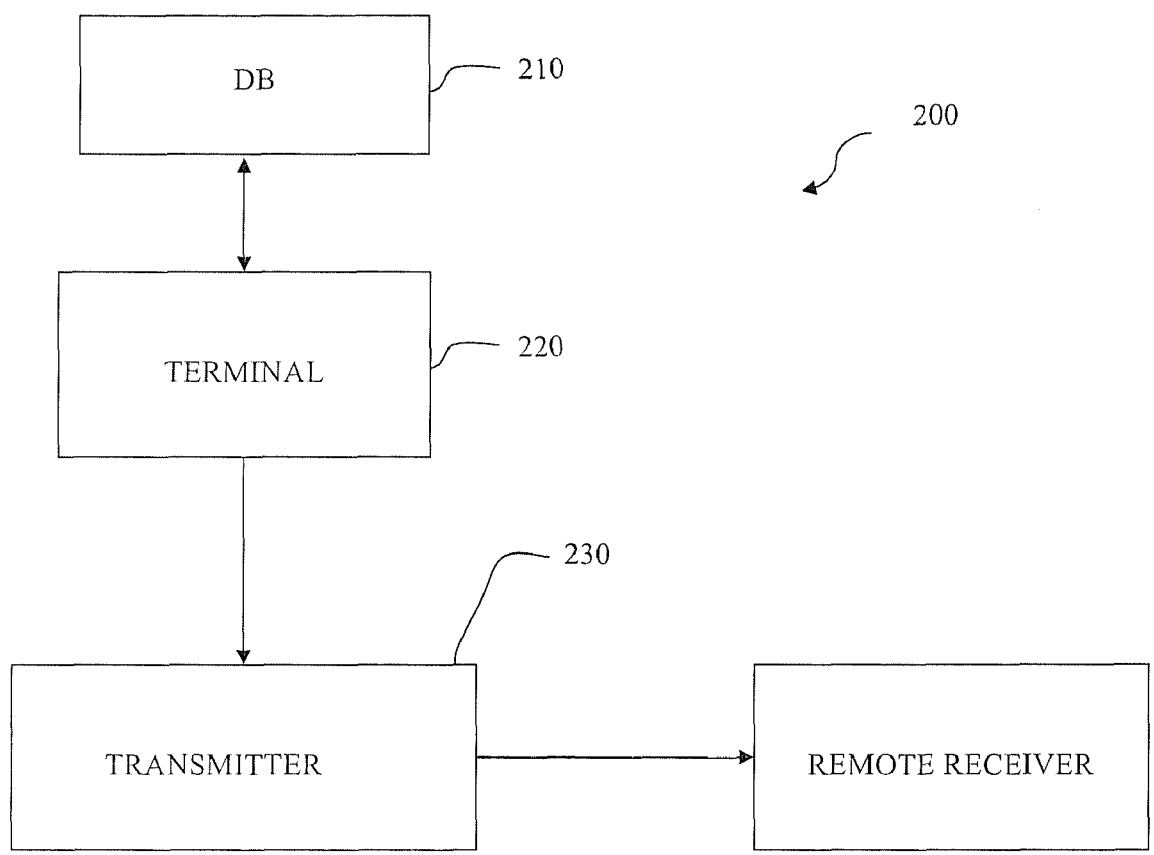
FIG. 2 is a schematic drawing of a transmission portion of an embodiment.

Turning to FIG. 2, an embodiment comprising a system 200 for transmitting a kill code is shown. According to this drawing, a database 210 is in bidirectional communication with a terminal 220. According to some embodiments, communication can take place either through hardwired electronic connections, or through remote wireless signaling. The terminal is also in electronic communication with a transmitter 230, which is adapted to receive an input signal from terminal 220 and to transmit an output signal due to the input signal. The output transmission signal can be received by a suitable receiving device, such as that which is set forth in FIG. 1 as number 110.

The system of FIG. 2 can operate according to the following steps. A query is entered at terminal 220, and sent to database 210. The database 210 returns a query response, such as a kill code, to the terminal where the response, or related information, can be displayed. The terminal can then relay the kill code to the transmitter and cause the transmitter to broadcast the kill code. A remote receiver 110 can then receive the broadcasted kill code. In an alternative embodiment, the terminal 220 is not in electronic communication with the transmitter, and therefore an operator manually directs the transmitter to broadcast a kill code.

Figure 3:
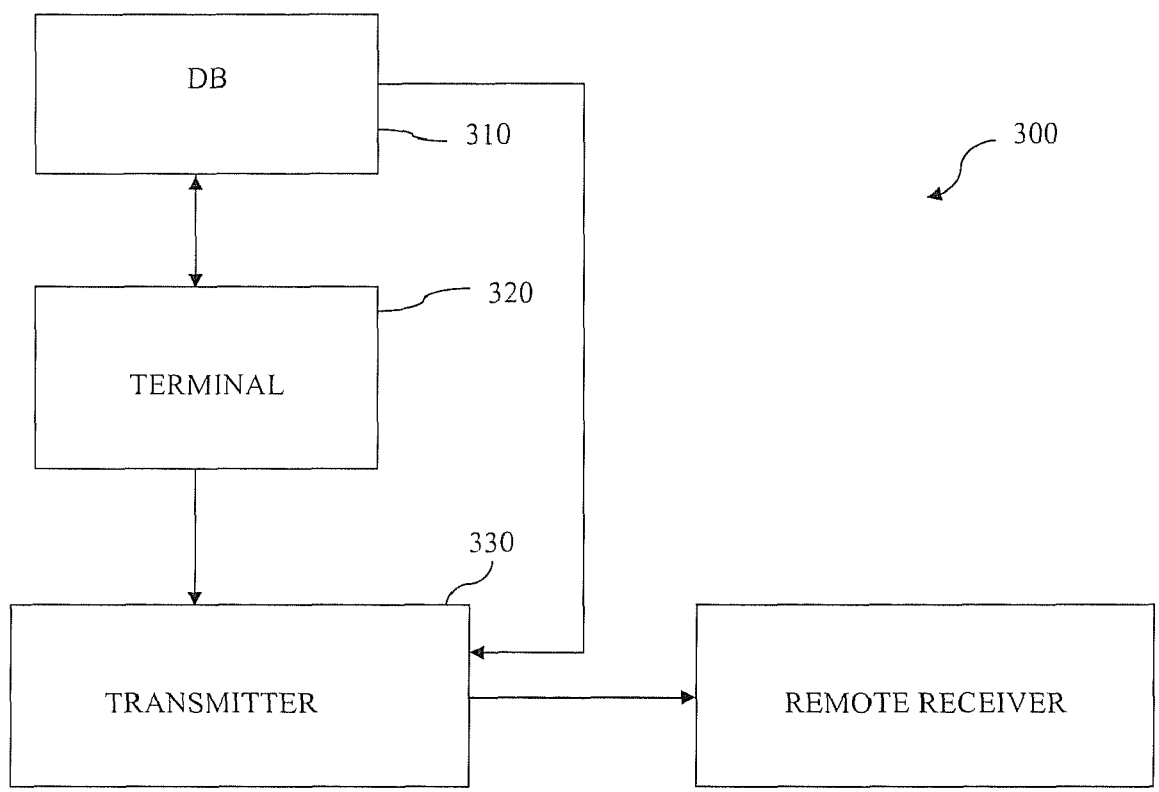
FIG. 3 is a schematic drawing showing a variation of FIG. 2.

FIG. 3 sets forth a variation of system 200. The system 300 of FIG. 3 shows a terminal 320 in bidirectional communication with a database 310, similar to system 200. Additionally, database 310 is also in direct electronic communication with transmitter 330. Therefore, according to FIG. 3, system 300 is capable of receiving a query from terminal 320, and relaying a kill code directly to transmitter 330. According to this embodiment, the database 310 may also send the kill code or related data to the terminal 320. The terminal 320 can then display the kill code to an operator, or can display related information such as whether the kill code has been sent to the transmitter 330 and/or broadcast. In an alternative embodiment, the terminal 320 is not in direct communication with the transmitter 330, and the transmitter 330 is capable of receiving communication from the transmitter 330, and not the terminal 320.

Figure 4:
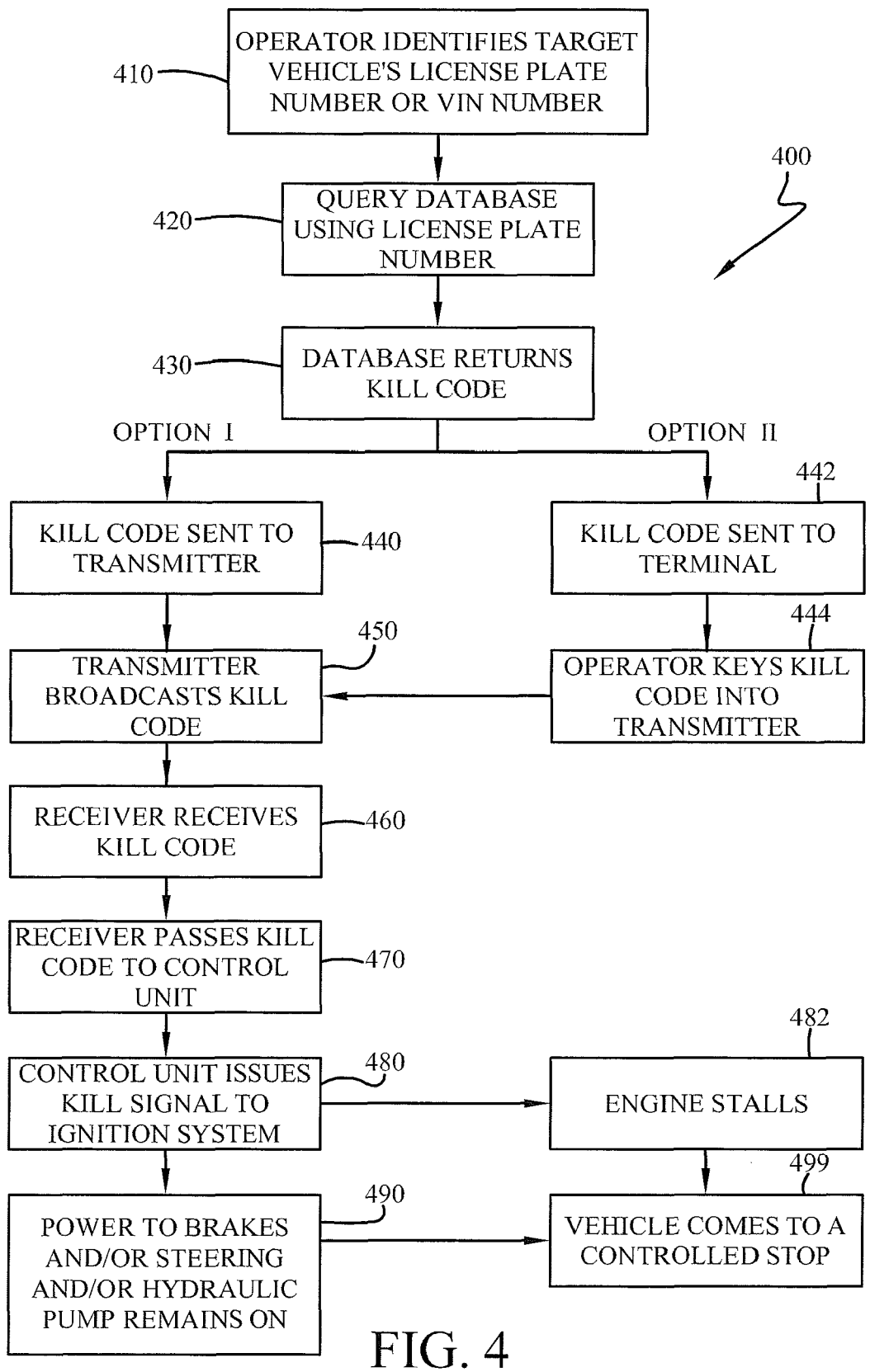
FIG. 4 is a flowchart showing a process according to an embodiment of the present invention.

Turning now to FIG. 4, a process 400 within the scope of the present invention is set forth. According to FIG. 4, an operator identifies a license plate number or VIN number 410. The operator then queries a database 420 using the license plate or VIN number. The database then returns a kill code 430 in response to the query. In one embodiment, labeled "Option I", the kill code is then relayed to a transmitter 440. Alternatively, according to "Option II", the kill code can be sent to a terminal 442, and then an operator manually keys the code into the transmitter 444. The transmitter then broadcasts the kill code 450. A receiver receives the kill code 460, and passes the code to a control unit 470. The control unit issues a signal that causes power to the ignition system to be shut off 480, causing the engine to stall 482. The control unit also issues a signal that causes the power to the braking and/or power steering systems and/or engine-driven hydraulic pump to remain in a power-on state 490. Accordingly, the vehicle comes to a controlled stop 499.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

I claim:

1. A vehicle disabling process, comprising the steps of:
   identifying a license plate number of a target vehicle;
   using the license plate number to lookup a code that is specific to the target vehicle;
   transmitting the code to the target vehicle from a remote transmitter;
   receiving the transmitted signal in the target vehicle;
   the target vehicle using the received signal to shut off an engine in the target vehicle; and
   maintaining power to the target vehicle's braking system, power steering system, or both the braking system and power steering system after engine shut-off.

2. The vehicle disabling process of claim 1, wherein the target vehicle is equipped with an electrical braking system.

3. The vehicle disabling process of claim 2, wherein the electrical braking system comprises an ABS braking system.

4. The vehicle disabling process of claim 1, wherein the target vehicle is equipped with an electrical steering system.

5. The vehicle disabling process of claim 1, wherein the step of maintaining further comprises maintaining at least one relay in a power-on configuration, the relay receiving power from a battery and supplying power to at least the target vehicle's braking system, power steering system, or both the braking system and power steering system.

6. The vehicle disabling process of claim 1, wherein the step of maintaining power further comprises supplying power from an alternate power source to at least one engine-driven hydraulic pump.

7. The vehicle disabling process of claim 6, wherein the step of supplying further comprises switching a relay to a power-on configuration, the relay receiving power from a battery and supplying power to at least the target vehicle's braking system, power steering system, or both the braking system and power steering system.

8. A vehicle disabling system, comprising:
   a kill code receiver disposed in a target vehicle and capable of receiving transmissions from a kill code transmitter disposed in a targeting vehicle;
   an engine shutdown component in electronic communication with the kill code receiver, the engine shutdown component for shutting down an engine of the target vehicle; and
   a power-maintaining component capable of maintaining power to at least one of a braking system and a power steering system of the target vehicle.

9. The system of claim 8, further comprising:
   a database containing license plate numbers and kill codes, and relating the license plate numbers to the kill codes, the database being disposed remotely from the targeting vehicle; and
   a terminal having a user input means and a display means, the terminal being in electronic communication with the database, the terminal being disposed in the targeting vehicle.

10. The system of claim 8, wherein the kill code transmitter operates in a range selected from the group consisting of infrared, microwave, radio, or any combination thereof.

11. The system of claim 10, wherein the kill code transmitter further comprises a laser.

12. The system of claim 8, wherein the engine shutdown component comprises a control unit in electronic communication with the kill code receiver and in electronic communication with a relay, the relay receiving power from a vehicle battery and supplying power to an ignition system.

13. The system of claim 8, wherein the power-maintaining component comprises a control unit in electronic communication with the kill code receiver, and in electronic communication with a relay, the relay receiving power from a vehicle battery and supplying power to the at least one of a braking system and a power steering system of the target vehicle.

14. The system of claim 13, wherein the relay takes on a power-off configuration when the engine shuts down unless the relay receives a control signal from the control unit causing it to remain in a power-on configuration after engine shutdown.

15. A vehicle disabling system, comprising:
   a kill code receiver disposed in a target vehicle and capable of receiving transmissions from a kill code transmitter disposed in a targeting vehicle;
   an engine shutdown component in electronic communication with the kill code receiver, the engine shutdown component for shutting down an engine of the target vehicle; and
   a power-maintaining component capable of maintaining power to one or more systems of the target vehicle;
   wherein the power-maintaining component comprises a control unit in electronic communication with the kill code receiver and in electronic communication with a relay, the relay receiving power from a vehicle battery and supplying power to at least one engine-driven hydraulic pump.

16. The system of claim 15, wherein the relay is in a power-off configuration unless the relay receives a control signal from the control unit causing the relay to switch to a power-on configuration.

17. The system of claim 16, wherein the relay is in a power-off configuration when the engine is on, and the relay is in a power-on configuration when the engine is off.

18. A vehicle disabling process, comprising the steps of:
   transmitting a code to the target vehicle from a remote transmitter;

receiving the transmitted signal in the target vehicle;
using the received signal to shut-off an engine in the target vehicle; and
maintaining power to at least one of the target vehicle's braking system, power steering system, and at least one engine-driven hydraulic pump after engine shut-off.

19. The vehicle disabling process of claim 18, wherein prior to the step of transmitting a code, the process comprises:
identifying a license plate number of a target vehicle; and
using the license plate number to lookup a code that is specific to the target vehicle.

20. The vehicle disabling process of claim 18, wherein prior to the step of transmitting a code, the process comprises:
identifying a VIN number of a target vehicle; and
using the VIN number to lookup a code that is specific to the target vehicle.

21. The vehicle disabling process of claim 18, wherein the target vehicle is equipped with at least one of an electrical braking system and an electrical steering system.

22. The vehicle disabling process of claim 18, wherein the step of maintaining power further comprises maintaining at least one relay in a power-on configuration, the relay receiving power from a battery and supplying power to at least one of the target vehicle's braking system, power steering system, and at least one engine-driven hydraulic pump.

23. The vehicle disabling process of claim 18, wherein the step of maintaining power further comprises supplying power from an alternate power source to the at least one engine-driven hydraulic pump.

24. A vehicle disabling system, comprising:
a kill code receiver disposed in a target vehicle and capable of receiving transmissions;
an engine shutdown component in electronic communication with the kill code receiver, the engine shutdown component for shutting down an engine of the target vehicle; and
a power-maintaining component capable of maintaining power to at least one of a braking system, a power steering system, and an engine-driven hydraulic pump of the target vehicle.

25. The system of claim 24, further comprising:
a database containing license plate numbers and kill codes, and relating the license plate numbers to the kill codes; and
a terminal having a user input means and a display means, the terminal being in electronic communication with the database; and
a kill code transmitter transmitting at least one kill code to the kill code receiver disposed in the target vehicle.

26. The system of claim 24, further comprising:
a database containing VIN numbers and kill codes, and relating the VIN numbers to the kill codes; and
a terminal having a user input means and a display means, the terminal being in electronic communication with the database; and
a kill code transmitter transmitting at least one kill code to the kill code receiver disposed in the target vehicle.

27. The system of claim 24, wherein the power-maintaining component comprises a control unit in electronic communication with the kill code receiver and in electronic communication with a relay, the relay receiving power from a vehicle battery and supplying power to the at least one of a braking system, a power steering system, and an engine-driven hydraulic pump of the target vehicle.

28. The system of claim 27, wherein the relay takes on a power-off configuration when the engine shuts down unless the relay receives a control signal from the control unit causing it to remain in a power-on configuration after engine shutdown.

* * * * *